United States Patent
Buchanan et al.

(10) Patent No.: US 8,004,961 B1
(45) Date of Patent: Aug. 23, 2011

(54) INDEPENDENTLY CONFIGURABLE PORT REDIRECTION IN A MULTI-PORT ETHERNET PHYSICAL LAYER

(75) Inventors: Benjamin Clyde Buchanan, Suwanee, GA (US); David Richard Rosselot, Atlanta, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 624 days.

(21) Appl. No.: 11/529,742

(22) Filed: Sep. 28, 2006

(51) Int. Cl.
*H04L 12/28* (2006.01)
*G06F 15/177* (2006.01)

(52) U.S. Cl. ............ 370/216; 370/351; 709/220

(58) Field of Classification Search .......... 370/216–228, 370/248, 254–258, 351–356, 401–413, 424–430; 709/217–223, 226, 228, 249, 250; 714/4, 714/5, 8, 16, 25, 100, 45
See application file for complete search history.

(56) References Cited

U.S. PATENT DOCUMENTS

| | | | | |
|---|---|---|---|---|
| 6,085,241 A * | 7/2000 | Otis | ............................. | 709/223 |
| 6,295,299 B1 * | 9/2001 | Haddock et al. | ............. | 370/423 |
| 6,308,215 B1 * | 10/2001 | Kolbet et al. | ................ | 709/233 |
| 6,876,654 B1 * | 4/2005 | Hegde | .......................... | 370/392 |
| 2003/0072316 A1 * | 4/2003 | Niu et al. | ...................... | 370/412 |
| 2003/0223376 A1 * | 12/2003 | Elliott et al. | .................. | 370/249 |
| 2006/0274647 A1 * | 12/2006 | Wang et al. | .................... | 370/216 |
| 2007/0211640 A1 * | 9/2007 | Palacharla et al. | ............ | 370/241 |

FOREIGN PATENT DOCUMENTS

| | | | |
|---|---|---|---|
| EP | 1729461 | * | 1/2006 |
| EP | 1729461 | * | 8/2006 |

OTHER PUBLICATIONS

"LXT973, 10/100 Mbps Dual-Port Fast Ethernet PHY Transceiver", Intel, Mar. 2002, 88 pages.

* cited by examiner

*Primary Examiner* — Aung S. Moe
*Assistant Examiner* — Prince Mensah

(57) ABSTRACT

A multi-port Ethernet Physical (PHY) layer device includes multiplexed datapaths and control logic such that each transmit data connection for a port may be mapped to any combination of the transmit data connections for one of multiple Media Access Control (MAC) layers, and each received data connection for a port may independently be mapped to an combination of the receive data connections for one of the MAC layers and the transmit data connection(s) for the other port(s). The device may be configured to operate in normal and port swap modes, to support failover switching and/or dedicated redundant connections, as a cable extender or media converter, as a snoop device, to form an Ethernet ring topology, for broadcast transmit or mirrored receive, or as a unidirectional repeater.

20 Claims, 5 Drawing Sheets

INDEPENDENTLY CONFIGURABLE PORT REDIRECTION IN A MULTI-PORT ETHERNET PHYSICAL LAYER

TECHNICAL FIELD OF THE INVENTION

The present invention is directed, in general, to multi-port Ethernet devices and, more specifically, to control of transmit and receive paths within multi-port Ethernet devices.

BACKGROUND OF THE INVENTION

Ethernet connections allow devices such as computers to communicate over a switched transmission medium. A multi-port Ethernet device may include a Media Access Control (MAC) interface for each port. However, multi-port physical layer (PHY) Ethernet devices typically employ multi-component designs, precluding features such as media conversion, cable extension, and port mirroring. External components in the form of Programmable Logic Devices, passive components and/or wiring are generally required.

There is, therefore, a need in the art for allowing flexible and independent assignment of receive and transmit data paths from any port in an Ethernet physical layer device to any MAC interface for the device.

SUMMARY OF THE INVENTION

To address the above-discussed deficiencies of the prior art, it is a primary object of the present invention to provide, for use in a multi-port Ethernet Physical (PHY) layer device, multiplexed datapaths and control logic enabling each transmit data connection for a port to be mapped to any combination of the transmit data connections for one of multiple Media Access Control (MAC) layers, and each received data connection for a port to be independently mapped to any combination of the receive data connections for one of the MAC layers and the transmit data connection(s) for the other port(s). The device may be configured to operate in normal and port swap modes, to support failover switching and/or dedicated redundant connections, as a cable extender or media converter, as a snoop device, to form an Ethernet ring topology, for broadcast transmit or mirrored receive, or as a unidirectional repeater.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
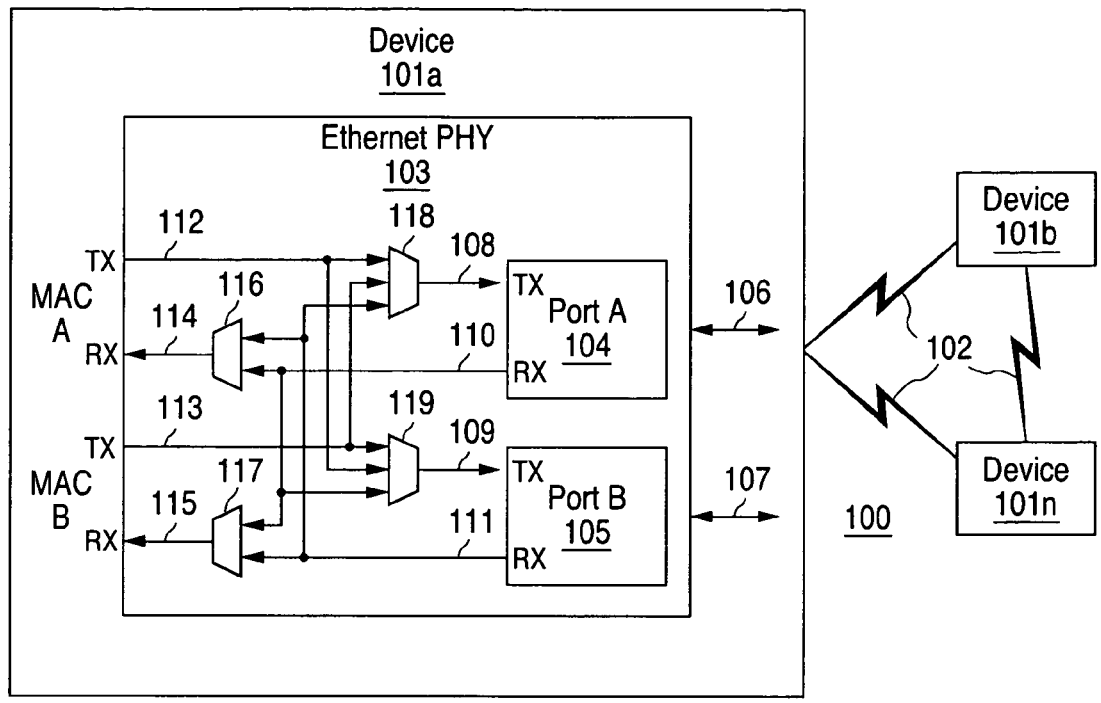
FIG. 1 is a high level block diagram of a system implementing a multi-port Ethernet physical layer allowing flexible and independent assignment of receive and transmit data paths according to one embodiment of the present invention.

FIG. 1 is a high level block diagram of a system implementing a multi-port Ethernet physical layer allowing flexible and independent assignment of receive and transmit data paths according to one embodiment of the present invention. System 100 includes a plurality of devices 101a-101n communicating over a switched transmission medium 102. Devices 101a-101n may be computers such as desktop or laptop computers, mobile devices such as wirelessly connected personal digital assistant (PDA) devices, or any other device such as an audio receiver, a personal video recorder, and the like. The switched transmission medium 102 may be a physical system such as coaxial cable, twisted pair wiring or optical fibers.

Those skilled in the art will recognize that the complete construction and operation of system 100 is not depicted or described herein. Instead, for simplicity and clarity, only so much of system 100 as is unique to the present invention or is necessary for an understanding of the present invention is depicted and described.

At least one and preferably all devices 101a-101n within system 100 include a multi-port physical layer (PHY) Ethernet device 103. In the exemplary embodiment, PHY device 103 includes two ports 104 and 105 coupled to physical connections 106 and 107 to the switched transmission medium 102. Ports 104 and 105 are the physical (i.e., wire-side) interface to the switched transmission medium 102, such as 10BASE-T, 100BASE-TX or 100BASE-FX connections. Connections 106 and 107 may be, for instance, plug jacks (e.g., RJ-45) or transceivers (e.g. electrical to optical devices). The Medium Dependent Interface (MDI) connectors and/or transceivers employed for connections 106 and 107 are not shown for simplicity, but are implicit components within the system design.

Each port 104 and 105 also includes a transmit (TX) input 108 and 109, respectively, for receiving data to be transmitted over switched transmission medium 102 and a receive (RX) output 110 and 111, respectively, for forwarding data received on switched transmission medium 102. PHY device 103 also includes duplicate transmit (TX) inputs 112 and 113 and multiplexed receive (RX) outputs 114 and 115 coupled to Media Access Control (MAC) layers MAC A and MAC B. The transmit input 112 and receive output 114 form an interface to MAC A, while transmit input 113 and receive output 115 form an interface to MAC B. MAC A and MAC B are implemented within a microcontroller, Application Specific Integrated Circuit (ASIC), System On Chip (SOC) circuit, etc. for device 101a. The interface between MAC A and MAC B and PHY device 103 may be a Media Independent Interface (MII) or Reduced Media Independent Interface (RMII) mode. The RMII mode interface, if employed, has a two bit wide data interface and a 50 mega-Hertz (MHz) common reference clock to the PHY layer.

Internal datapaths and multiplexers 118-119 selectively connect input 112 to either of inputs 108 and 109, and similarly selectively connect input 113 to either of inputs 108 and 109. Other internal datapaths and multiplexers 116-119 selectively connect either output 110 to one or more of outputs 114-115 and input 109 or output 111 to one or more of outputs 114-115 and input 108. The internal datapaths are directed to the desired locations through the network of multiplexers 116-119, and each datapath can be individually assigned. For instance, data transmitted from MAC A may lead out through Port A 104, Port B 105, or both. Such an assignment may be independent from the datapath assignments from other inputs at Port A 104, Port B 105 and MAC B.

A default configuration for PHY device 103 preferably allows each port to act independently, such as by mapping each port's transmitter and receiver straight to corresponding MAC interfaces (i.e., input 112 for MAC A mapped to input 108 for Port A 104, output 110 for Port A 104 mapped to output 114 for MAC A, input 113 for MAC B mapped to input 109 for Port B 105, and output 111 for Port B 105 mapped to output 115 for MAC B). Either or both MAC interfaces may be disabled, such as by mapping input 113 for MAC B to input 109 for Port B 105 and output 111 for Port B 105 to output 115 for MAC B, but leaving input 112 and output 114 for MAC A unmapped, or by mapping input 112 for MAC A to input 108 for Port A 104 and output 110 for Port A 104 to output 114 for MAC A, but leaving input 113 and output 115 for MAC B unmapped.

A port swap mode configuration for PHY device 103 maps each MAC interface to the opposite port (i.e., input 112 for MAC A mapped to input 109 for Port B 105, output 111 for Port B 105 mapped to output 114 for MAC A, input 113 for MAC B mapped to input 108 for Port A 104, and output 110 for Port A 104 mapped to output 115 for MAC B). Such a port swap mode allows ports to be switched when the cables are incorrectly connected or when the role of the attached networks is changed, such that the cable connections need to be swapped. Dynamic port configuration handled by software allows the connections to be changed within PHY device 103 rather than requiring a physical swapping of the cables.

The port swap mode may also be used as part of software-assisted failover from one link to another. For instance, if connection 106 is a primary link and connection 107 is a secondary link for MAC A within PHY device 103, during normal operation input 112 would be mapped to input 108 and output 110 would be mapped to output 114, while in failover condition input 112 would be mapped to input 109 and output 111 would be mapped to output 114. When a failure is detected on the primary link, the data traffic is swapped to the secondary port.

An extension of software-assisted failover allows the PHY device 103 to act as a single physical layer with dedicated fiber and copper ports. For example, the primary network connected to Port A 104 may be copper, with a 100BASE-TX connection, while the secondary network connected to Port B 105 is fiber, with a 100BASE-FX connection. During normal operation, MAC A may be mapped to the copper port, Port A 104, and upon detection of failover MAC A may be switched over to map to the fiber port, Port B 105.

Figure 2:
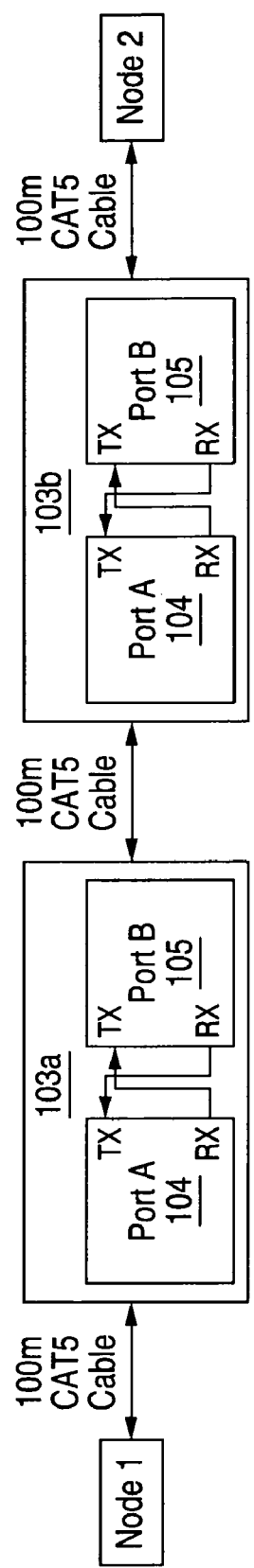

PHY device 103 also preferably implements a cable extender mode, which allows the installation of longer cables than the normal standards in the absence of a switch. In such a mode, the output 110 of Port A 104 is mapped to the input 109 of Port B 105 while the output 111 of Port B 105 is mapped to the input 108 of Port A 104. In copper mode, a single PHY device 103 can extend a 100 meter (m) cable limit to 200 meters, while in fiber mode a single PHY device 103 can extend a 1 kilometer (km) cable limit to 2 km. This extender mode functions in both 10 mega-bits per second (Mb/s) copper or 100 Mb/s copper or fiber environments, but requires the connection and each end node to operate at the same speed. The speed configuration is accomplished via autonegotiation straps for copper and automatically for fiber. In copper environments, this extender mode can be used with Power Over Ethernet to provide a simple cable extending solution without the need for a power source in the middle of the cable installation. FIG. 2 diagrammatically illustrates an extender mode example employed two PHY devices 103a and 103b for a 300 m copper connection between two nodes, node 1 and node 2. The MAC interfaces within PHY devices 103a and 103b are not used for the connection.

Figure 3:
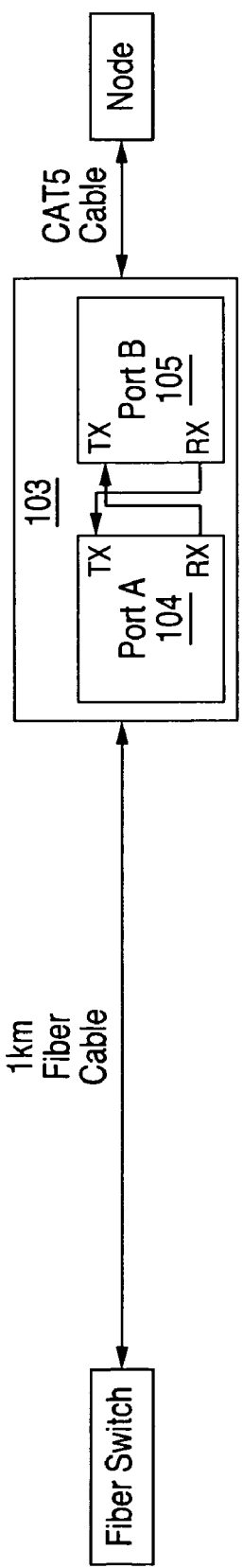

A media converter mode preferably implemented by PHY device 103 allows conversion of copper to fiber and vice-versa at 100 Mb/s, a configuration allowing longer-run fiber to be used in situations where fiber support is not built into the end device. FIG. 3 diagrammatically illustrates use of PHY device 103 as a media converter between a fiber switch with a fiber cable and a node utilizing a copper input. This configuration may also be combined with Power Over Ethernet on the copper side.

Figure 4:
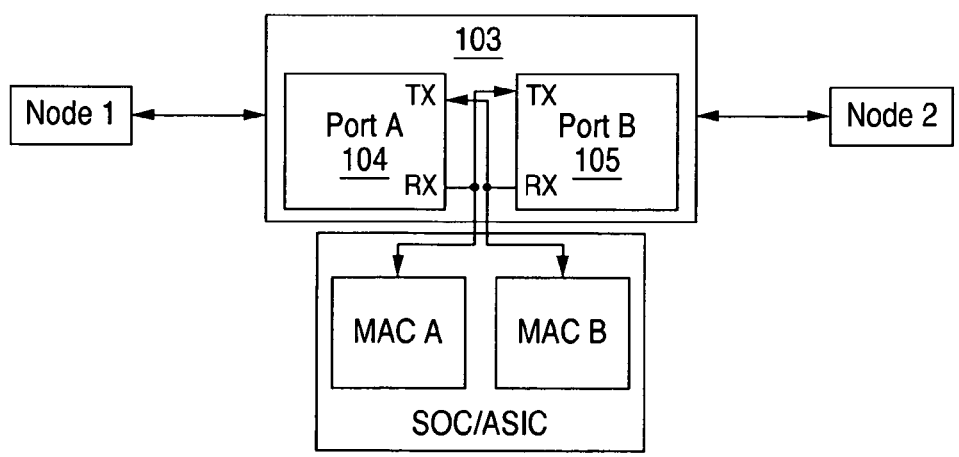
FIGS. 2 through 7 are high level diagrams of various configurations for a multi-port Ethernet physical layer allowing flexible and independent assignment of receive and transmit data paths according to one embodiment of the present invention.

An Ethernet-based snoop device may be created by combining the extender functionality of PHY device 103 with normal port mapping. This snoop device configuration supports applications that require the attachment of a device into the line that will mirror received traffic for a third node to monitor. The snoop device configuration requires a pass-through from Port A 104 to Port B 105 (i.e., connection in extender mode) as well as concurrent connection from the port of interest to the MAC RX interface connection 114 or 115. Only one direction of traffic can be seen at a time unless both MAC RX interface connections 114 and 115 are employed. FIG. 4 diagrammatically illustrates a snoop device configuration using PHY device 103.

Figure 5:
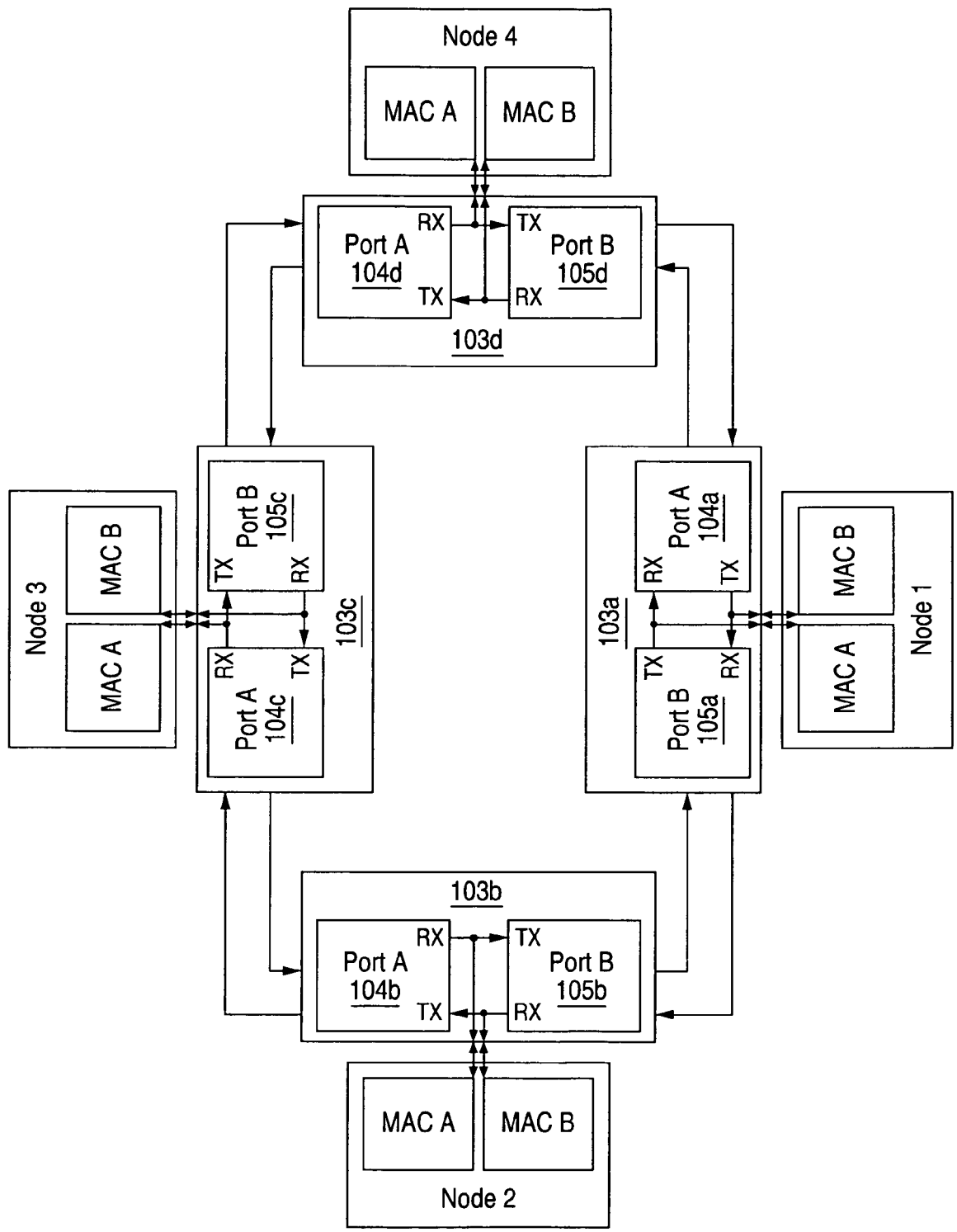

Another possible network configuration employing PHY device 103 dynamically selects between the extender mode and the normal mode to support an Ethernet-based Ring Topology. In a ring network, where each node is allocated a time slice, the PHY device 103 may be controlled by software to deliver only the appropriate packets to the node, sending the bulk of the traffic on to the next node. Outgoing packet transmission onto the ring network from a given node may be performed simultaneously with appropriate packet reception, reducing the burden on the node processor. FIG. 5 diagrammatically illustrates an Ethernet ring network with four nodes, implemented using a PHY device 103.

Referring back to FIG. 1, a broadcast transmit mode is preferably implemented to allow both Port A 104 and Port B 105 to transmit from a single MAC, MAC A or MAC B. For broadcast transmit mode from MAC A, input 112 is mapped both to input 108 for Port A 104 and to input 109 for Port B 105, concurrently, while broadcast transmit mode from MAC B entails concurrently mapping input 113 to both input 108 for Port A 104 and to input 109 for Port B 105. The receive port assignments are independent, and therefore need not be considered in this mode. To ensure synchronous operation, both Port A 104 and Port B 105 should be operating in RMII mode, and operating at the same speed (10 or 100 Mb/s) in full duplex mode to ensure that no collisions are seen.

Figure 6A:
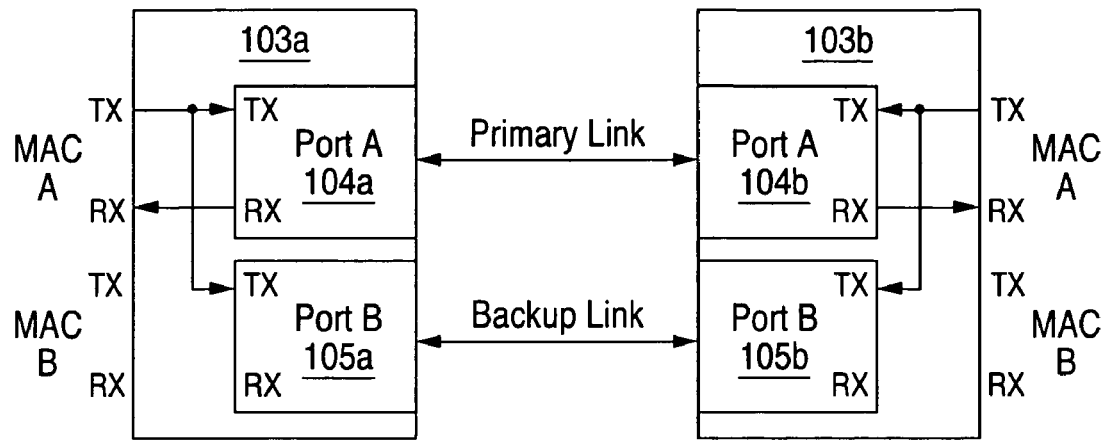
Figure 6B:
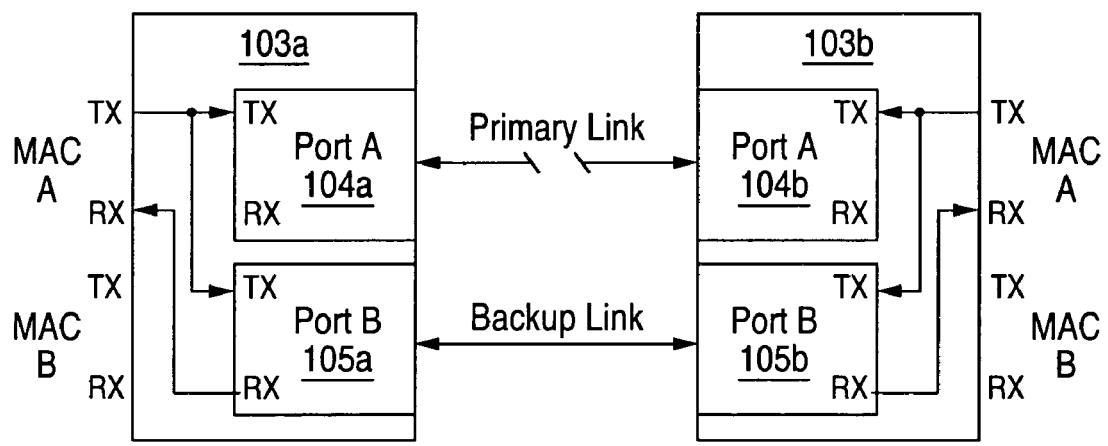
Figure 7:
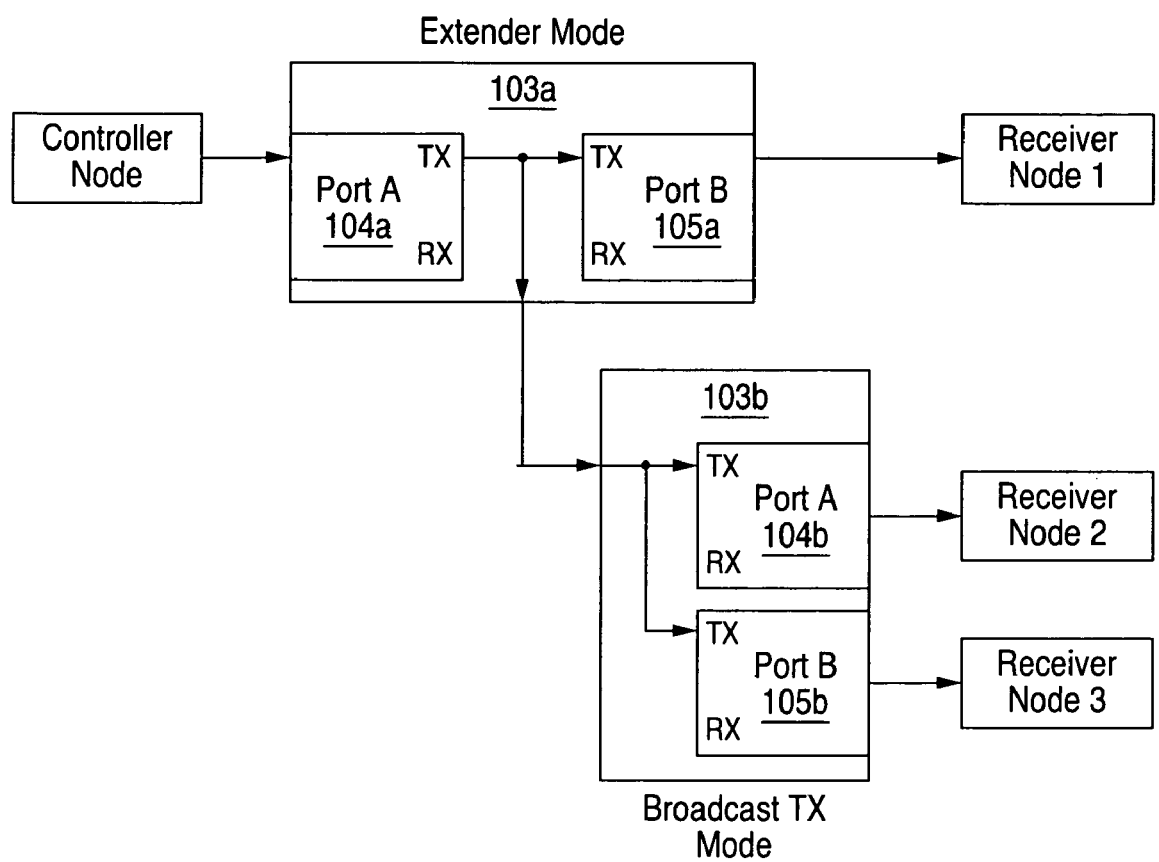

In situation where redundancy is important, PHY device 103 may be employed with two channels running concurrently for the fastest possible failover. Such a configuration is diagrammatically illustrated in FIGS. 6A and 6B, where FIG. 6B illustrates failover when the primary link is broken for the exemplary embodiment. The transmit side of each node operates in broadcast transmit mode, while the receive side selects one port or the other via external control responding to link status.

A mirror receive mode is preferably implemented within PHY device 103, in which one port's receive data is reflected on both MAC interfaces. Referring back to FIG. 1, either output 110 is mapped to both outputs 114 and 115, concurrently, or output 111 is mapped to both outputs 114 and 115, concurrently. The transmit port assignments are independent, and therefore need not be considered in this mode.

More unusual applications for PHY device 103 may be created by combining modes of operation. For example, where one node controls three other nodes, two PHY devices may be connected together to form a 1-to-3 unidirectional repeater as diagrammatically illustrated in FIG. 7. Both PHY devices 103a and 103b should be operating in RMII mode, with one PHY device 103a operating in extender mode and the other 103b operating in broadcast transmit mode.

In implementing any of the above-described configurations and/or modes, PHY device 103 supports flexible assignment for each port to the MII/RMII interface of either MAC. Either of the MAC interfaces MAC A or MAC B may be assigned to the physical ports Port A 104 or Port B 105, with the assignments controlled by an internal register (not shown). Separate transmit and receive assignments should be enabled to allow greater flexibility (e.g., both ports could transmit from MAC A while allowing separate receive paths for the ports). In addition, the opposite receive port may be used as the transmit source for a port, enabling the cable extender and media converter modes described above. Thus, for example, receive output 110 for Port A 104 may source data to transmit input 109 for Port B 105, while receive output 111 for Port B 105 may source data to transmit input 108 for Port A 104. For proper clock synchronization, PHY device 103 should operate in RMII mode when the ports are mapped in that manner.

Exemplary receive and transmit port control bits and port mapping configurations are provided in TABLES I through III below:

TABLE I

| Control Bits | Port's Desired RX MAC Destination |
|---|---|
| 00 | Normal |
| 01 | Opposite |
| 10 | Both |
| 11 | Disabled |

TABLE II

| Port A Control Bits | Port B Control Bits | RX MAC A Data Source | RX MAC B Data Source |
|---|---|---|---|
| 00 | 00 | Port A | Port B |
| 00 | 01 | Port A | Port B |
| 00 | 10 | Port A | Port B |
| 00 | 11 | Port A | Disabled |
| 01 | 00 | Port A | Port B |
| 01 | 01 | Port B | Port A |
| 01 | 10 | Port B | Port A |
| 01 | 11 | Disabled | Port A |
| 10 | 00 | Port A | Port B |
| 10 | 01 | Port B | Port A |
| 10 | 10 | Port A | Port B |
| 10 | 11 | Port A | Port A |
| 11 | 00 | Disabled | Port B |
| 11 | 01 | Port B | Disabled |
| 11 | 10 | Port B | Port B |
| 11 | 11 | Disabled | Disabled |

TABLE III

| Control Bits | TX Port Data Source |
|---|---|
| 00 | Normal |
| 01 | Opposite |
| 10 | Opposite RX |
| 11 | Disabled |

The use of flexible port switching offers system developers a host of unique, customizable features to meet the needs for specific applications. The system developer may configure each internal datapath independently, offering significant advantages over other multi-port physical layer devices. In particular, flexible assignment of the ports enables many options not available in multi-component physical layer designs, including media conversion, cable extension and port mirroring.

Flexible port switching allows the datapath between the cable side ports and the MAC interfaces to be modified either at system development or dynamically via the controlling software. In a dual port device, many different configurations may be developed to address the specific needs of various applications, such as snooping devices and ring topologies.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A multi-port Ethernet physical layer system comprising:
   a first Ethernet Media Access Control (MAC) interface and a second Ethernet MAC interface, wherein the first and second Ethernet MAC interfaces are configured to be simultaneously operational;
   a physical layer (PHY) configured to independently and dynamically map data traffic using datapath routing logic in order to route data to the first and second Ethernet MAC interfaces, wherein the datapath routing logic is configured to dynamically select an operating mode for the first and second Ethernet MAC interfaces;
a first port configured to be coupled to the first and second Ethernet MAC interfaces, wherein the first port is configured to operate in a broadcast transmit mode; and
a second port configured to be coupled to the first and second Ethernet MAC interfaces, wherein the second port is configured to operate in the broadcast transmit mode;
wherein the datapath routing logic is configured to (i) control coupling of a first receive output for the first port and a first transmit input for the first port independently of each other and (ii) control coupling of a second receive output for the second port and a second transmit input for the second port independently of each other; and
wherein the datapath routing logic is configured, in a specified mode, to couple the first receive output for the first port to a first receive data connection for the first Ethernet MAC interface and to the second transmit input for the second port.

2. The multi-port Ethernet physical layer system according to claim 1, wherein the datapath routing logic is also configured to selectively operate in a normal mode in which:
the first receive output for the first port is coupled to the first receive data connection for the first Ethernet MAC interface;
the first transmit input for the first port is coupled to a first transmit data connection for the first Ethernet MAC interface;
the second receive output for the second port is coupled to a second receive data connection for the second Ethernet MAC interface; and
the second transmit input for the second port is coupled to a second transmit data connection for the second Ethernet MAC interface.

3. The multi-port Ethernet physical layer system according to claim 1, wherein the datapath routing logic is also configured to selectively operate in a port swap mode in which:
the first receive output for the first port is coupled to a second receive data connection for the second Ethernet MAC interface;
the first transmit input for the first port is coupled to a second transmit data connection for the second Ethernet MAC interface;
the second receive output for the second port is coupled to the first receive data connection for the first Ethernet MAC interface; and
the second transmit input for the second port is coupled to a first transmit data connection for the first Ethernet MAC interface.

4. The multi-port Ethernet physical layer system according to claim 3, wherein the datapath routing logic is configured to selectively operate in the specified mode in which:
the second receive output for the second port is coupled to the first transmit input for the first port.

5. The multi-port Ethernet physical layer system according to claim 4, wherein:
the first port is configured to be connected to a first cable coupling the first port to a first node;
the second port is configured to be connected to a second cable coupling the second port to a second node; and
the multi-port Ethernet physical layer system is configured to function as one of:
a cable extender coupling the first and second nodes; and
a media converter coupling the first cable to the second cable, wherein the first cable is a cable of a first type and the second cable is a cable of a second type.

6. The multi-port Ethernet physical layer system according to claim 1, wherein the datapath routing logic is configured to connect the second receive output for the second port to a second receive data connection for the second Ethernet MAC interface and to the first transmit input for the first port.

7. The multi-port Ethernet physical layer system according to claim 1, wherein the datapath routing logic is configured to connect a transmit data connection for the first Ethernet MAC interface to the first transmit input for the first port and to the second transmit input for the second port.

8. The multi-port Ethernet physical layer system according to claim 1, wherein the datapath routing logic is configured to connect the first receive output for the first port alternatively to the first receive data connection for the first Ethernet MAC interface or to a second receive data connection for the second Ethernet MAC interface.

9. A method of operating a multi-port Ethernet physical layer system, the method comprising:
coupling each of first and second ports to a transmission medium; and
routing data through a physical layer (PHY), wherein the routing comprises independently and dynamically mapping data traffic using datapath routing logic in order to route the data to first and second Ethernet Media Access Control (MAC) interfaces, wherein the datapath routing logic dynamically selects an operating mode for the first and second Ethernet MAC interfaces, wherein the datapath routing logic dynamically allows each of the first and second Ethernet MAC interfaces to communicate through at least one of the first and second ports, wherein the first and second Ethernet MAC interfaces are configured to be simultaneously operational;
wherein the routing further comprises:
controlling coupling of each of a first receive output for the first port and a first transmit input for the first port independently of each other;
controlling coupling of each of a second receive output for the second port and a second transmit input for the second port independently of each other; and
in a specified mode, connecting the first receive output for the first port to a first receive data connection for the first Ethernet MAC interface and to the second transmit input for the second port.

10. The method according to claim 9, further comprising selectively operating in a normal mode in which:
the first receive output for the first port is coupled to the first receive data connection for the first MAC interface;
the first transmit input for the first port is coupled to a first transmit data connection for the first MAC interface;
the second receive output for the second port is coupled to a second receive data connection for the second MAC interface; and
the second transmit input for the second port is coupled to a receive transmit data connection for the second MAC interface.

11. The method according to claim 9, further comprising selectively operating in a port swap mode in which:
the first receive output for the first port is coupled to a second receive data connection for the second MAC interface;
the first transmit input for the first port is coupled to a second transmit data connection for the second MAC interface;

the second receive output for the second port is coupled to the first receive data connection for the first MAC interface; and the second transmit input for the second port is coupled to a first transmit data connection for the first MAC interface.

12. The method according to claim 11, further comprising selectively operating in the specified mode in which:
the second receive output for the second port is coupled to the first transmit input for the first port.

13. The method according to claim 12, wherein coupling each of the first and second ports to a transmission medium comprises:
connecting the first port to a first cable coupling the first port to a first node; and
connecting the second port to a second cable coupling the second port to a second node; and
wherein the multi-port Ethernet physical layer system functions as one of:
a cable extender coupling the first and second nodes; and
a media converter coupling the first cable to the second cable, wherein the first cable is a cable of a first type and the second cable is a cable of a second type.

14. The method according to claim 9, further comprising: connecting the second receive output for the second port to a second receive data connection for the second MAC interface and to the first transmit input for the first port.

15. The method according to claim 9, further comprising: connecting a transmit data connection for the first MAC interface to the first transmit input for the first port and to the second transmit input for the second port.

16. The method according to claim 9, further comprising: connecting the first receive output for the first port alternatively to the first receive data connection for the first MAC interface or to a second receive data connection for the second MAC interface.

17. A multi-port Ethernet physical layer system comprising:
a first Ethernet Media Access Control (MAC) interface and a second Ethernet MAC interface, wherein the first and second Ethernet MAC interfaces are configured to be simultaneously operational;
a physical layer (PHY) configured to independently and dynamically map data traffic using datapath routing logic in order to route data to the first and second Ethernet MAC interfaces;
a first port configured to be coupled to the first and second Ethernet MAC interfaces, wherein the first port is configured to operate in a broadcast transmit mode; and
a second port configured to be coupled to the first and second Ethernet MAC interfaces, wherein the second port is configured to operate in the broadcast transmit mode;
wherein the datapath routing logic is configured to (i) control coupling of a first receive output for the first port and a first transmit input for the first port independently of each other and (ii) control coupling of a second receive output for the second port and a second transmit input for the second port independently of each other; and
wherein the datapath routing logic is configured to selectively operate in a normal mode in which:
the first receive output for the first port is coupled to a first receive data connection for the first Ethernet MAC interface;
the first transmit input for the first port is coupled to a first transmit data connection for the first Ethernet MAC interface;
the second receive output for the second port is coupled to a second receive data connection for the second Ethernet MAC interface; and
the second transmit input for the second port is coupled to a second transmit data connection for the second Ethernet MAC interface.

18. The multi-port Ethernet physical layer system according to claim 17, wherein the datapath routing logic is further configured to selectively operate in a mode in which at least one of:
the first receive output for the first port is coupled to the second transmit input for the second port; and
the second receive output for the second port is coupled to the first transmit input for the first port.

19. A multi-port Ethernet physical layer system comprising:
a first Ethernet Media Access Control (MAC) interface and a second Ethernet MAC interface, wherein the first and second Ethernet MAC interfaces are configured to be simultaneously operational;
a physical layer (PHY) configured to independently and dynamically map data traffic using datapath routing logic in order to route data to the first and second Ethernet MAC interfaces;
a first port configured to be coupled to the first and second Ethernet MAC interfaces, wherein the first port is configured to operate in a broadcast transmit mode; and
a second port configured to be coupled to the first and second Ethernet MAC interfaces, wherein the second port is configured to operate in the broadcast transmit mode;
wherein the datapath routing logic is configured to (i) control coupling of a first receive output for the first port and a first transmit input for the first port independently of each other and (ii) control coupling of a second receive output for the second port and a second transmit input for the second port independently of each other; and
wherein the datapath routing logic is configured to selectively operate in a port swap mode in which:
the first receive output for the first port is coupled to a second receive data connection for the second Ethernet MAC interface;
the first transmit input for the first port is coupled to a second transmit data connection for the second Ethernet MAC interface;
the second receive output for the second port is coupled to a first receive data connection for the first Ethernet MAC interface; and
the second transmit input for the second port is coupled to a first transmit data connection for the first Ethernet MAC interface.

20. The multi-port Ethernet physical layer system according to claim 19, wherein the datapath routing logic is further configured to selectively operate in a mode in which at least one of:
the first receive output for the first port is coupled to the second transmit input for the second port; and
the second receive output for the second port is coupled to the first transmit input for the first port.

* * * * *